Patented Feb. 12, 1952

2,585,875

UNITED STATES PATENT OFFICE 2,585,875

4-TERTIARY ALKYL CHLOROPHENOXY-ACETIC ACIDS AND THE USE THEREOF AS PLANT HORMONE SYNERGISTS

Miller W. Swaney, Westfield, and Leo Z. Jasion, Elizabeth, N. J., assignors to Standard Oil Development Company, a corporation of Delaware No Drawing. Application September 11, 1947, Serial No. 773,508

10 Claims. (Cl. 71—2.6)

This invention relates to plant stimulants and more particularly to new improved synthetic plant hormone compositions which are especially useful as plant stimulants, selective weed killers and for many other plant applications.

This application is a continuation in part of our copending application for patent Ser. #700,826, filed on October 2, 1946, now abandoned.

Plant hormones are chemical substances of natural or synthetic origin, which perform the function of growth regulation or other physiological reaction in the plant system by virtue of their being absorbed into the system, and are capable of being translocated to various organs by diffustion and other means. In proper concentration they foster growth through cell elongation, cell division, rooting, bud development (broadly stem-producing botanical structures), dormancy regulation, sexual devolopment, and the like. In other concentrations they function as systemic poisons, affecting germination and even, in some cases, causing death of the treated members.

Plant hormones have been known, or suspected, for many years. Kögl and co-workers (Z. physiol. Chem., 216, 31, 1933; 225, 215, 1934; 235, 210, 1935;) isolated three crystaline substances from natural sources, all giving positive hormone reactions in plants. These were named auxin $a$ ($C_{18}H_{32}O_5$); auxin $b$ ($C_{18}H_{30}O_4$), and hetero-auxin (indoleacetic-acid, $C_{10}H_9O_2N$). All three of these substances were found to be cyclic monocarboxylic acids containing some unsaturation. Some time later, Hitchcock and Zimmerman and others (Contributions from Boyce Thompson Institute, vol. 7, 87–95, 209–229, 447–476 (1935); vol. 8, No. 1, 105–112 (1936)) found several types of cyclic acids to be physiologically active for plants, namely, indolepropionic and indole-butyric acids, and phenylacetic and naphthalene acetic acids, and their salts and esters, etc. Later (Contrib. Boyce Thompson Institute, vol. 12, 321–343, 497–508 (1942)) the aryloxy and halogenated aryloxy-acids, e. g., 4-chlorophenoxyacetic acid and 2,4-dichlorophenoxyacetic acid, were found to be exceedingly active in inducing hormone-like responses in green plants when applied in low concentrations, and which in higher concentrations caused undesirable poisoning effects.

The poisoning of plants by an overdose of certain synthetic hormone or plant nutrients has been put to use by several investigators. For many years calcium cyanamide, a well-known fertilizer, has been used in high concentrations for the eradication of weeds. In England, around 1940–41 Slade, Sexton, and Templeman (Nature, v. 155, 497, 1945) and in the United States, Hamner and others (Bot. Gaz. 105, 474, 1944; Science, 100, 154, 1944) employed overdoses of the synthetic plant hormones such as naphthaleneacetic acid and the chlorinated phenoxyacetic acids, e. g., 2,4-dichlorophenoxyacetic acid (2,4,-D), for weed killing purposes. They functioned more or less selectively in killing the dicotyledonous or broad-leaf plants with little damage to the grasses and cereals or monocotyledons.

In the prepartion and testing of a large number of chemical substances for hormone responses in plants it was discovered that the introduction of a tertiary-alkyl grouping into the phenoxyacetic acid nucleus produced compounds which, when dissolved in water as their sodium salts, exhibited much better foaming and wetting properties than either the parent compound or the straight 'chlorine or methyl containing phenoxyacetic acids and that these solutions wetted plant surfaces in a much more desirable manner, a feature of immense practical significance. Therefore, it was decided to combine the tertiary butyl grouping with halogen, in the manner outlined previously, in an effort to produce superior herbicidal type hormones of improved surface tension properties.

It was then discovered, very unexpectedly, and unpredictably in the light of previous knowledge, that when certain para-tertiary alkylchlorphenoxyacetic acid compounds which themselves have no phytological activity, are combined with known plant hormones, a total plant activity is obtained which is greater than that which would be obtained if an equivalent amount of pure plant hormone alone were used. These new compounds of this invention thus exhibit marked synergistic effects. These compounds, whether synthesized directly by condensing para-tertiary alkyl chlorophenols with chloroacetic acid, or by first chlorinating paratertiary alkyl phenol to the various chloro stages and then condensing the mixed isomers with chloroacetic acid, or by condensing a tertiary olefin with phenol followed by chlorination and condensation with chloroacetic acid, are products of high synergistic activity and high wetting power for plant surfaces.

Either of the above listed latter two methods of production of these compounds may result in the simultaneous production of as much as 10% 2,4-dichlorophenoxyacetic acid as a by-product. This provides a practical means of testing the synergistic efficacy of the new compounds of this invention. The crude para-tertiary alkyl chlorophenoxyacetic acid compounds containing some 2,4-dichlorophenoxyacetic acid can be compared with both pure 2,4-dichlorophenoxyacetic acid and the pure para-tertiary alkyl chlorophenoxyacetic acid compounds for hormone activity.

In this manner it has been ascertained that when para-tertiary alkyl phenols are chlorinated progressively up to the tetra chloro stage, and samples taken at various stages and converted to the corresponding phenoxyacetic acids, the mixed isomers representing substantially the dichloro stage are exceedingly potent artificial plant hormone synergists and produce several kinds of drastic growth regulating responses in green plants. Hormone synergistic activity drops off sharply for the trichlorinated acids and is substantially absent from the products derived from the final chlorination products. This is represented structurally as follows for the para-tertiary butyl phenoxyacetic acid compounds:

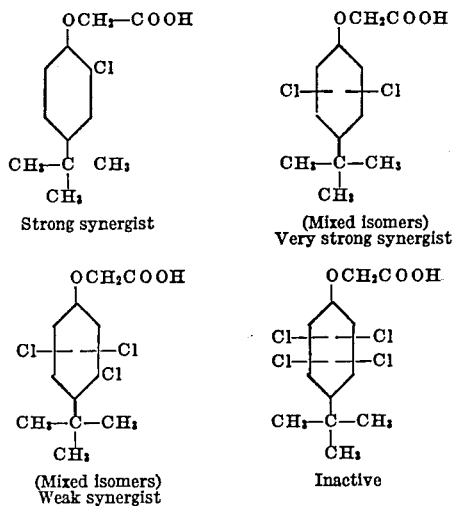

Strong synergist (Mixed isomers) Very strong synergist (Mixed isomers) Weak synergist Inactive In the above structural formulae the linkage of chlorine to a specific carbon atom in the aromatic nucleus has been shown only where such isomers have been isolated and positively identified. In all other cases the connection of the chlorine with the nucleus indicates a possible mixture of isomers which are not separately identified. Each of these compounds, except the tetra chloride, may also contain an additional tertiary butyl group linked to the nucleus in a proportion up to about 20 to 40% of the molecules present. That is, about 20 to 40% of the p-alkyl phenoxy radicals may contain a second tertiary butyl radical. This is accomplished by carrying further the alkylation of the phenoxy compound. It is to be understood, however, that this invention is not limited to the use of this exact degree of alkylation; for example, if less than 1.0 mol of isobutylene is used per mol of phenol, the resulting product will be useful at least to the extent that it contains the mono-t-butyl derivative in the "4" position.

This invention will be better understood by the following examples of methods of preparation of these compounds and tests on their use.

Hormone activity as related herein was determined using the green tissue method outlined by Zimmerman et al. (Contributions Boyce Thompson Inst., v. 14 (2), 91, 1945) and responses noted were of four main types, namely: (1) bending and distortion of stems, etc., due to epinastic growth, (2) modification of growing organs, leaves, tips, etc., (3) formation of adventitious roots, and/or (4) herbicidal activity resulting in death of plant.

Following the methods outlined for preparing the compounds of this invention there are several possibilities for the formation of structural isomers, both in relation to position of the tertiary alkyl group and the chlorine atoms attached to the ring, although conditions are selected which will minimize chlorination of the tertiary alkyl group. Relative to the most active products of the series, the para-tertiary alkyl dichlorinated-phenoxyacetic acids, there is some question as to the exact spatial configuration of the predominant isomers, that is, whether the two chlorine atoms are predominantly ortho-ortho or ortho-meta (2,5), although the active products will be adequately defined by their methods of preparation hereinafter described by the specific examples.

EXAMPLE I 600 grams (4.0 moles) of para-tertiary butyl phenol was placed into a flask. This was heated until molten (110° C.), addition of chlorine was begun (light excluded) and the temperature gradually allowed to drop to 60°–80° C. Chlorination was continued with the temperature maintained at about 60 and 70° C. until weight gain showed approximately 140 grams of chlorine reacted. A 200 gram portion of monochlorinated para-tertiary butylphenol was removed as product A. The remainder was further chlorinated in this manner until the successively higher stages of chlorination were reached, namely; dichlorinated para-tertiary butylphenol (product B), trichlorinated para-tertiary butylphenol (product C), and tetra-chlorinated para-tertiary butylphenol (product D). Each of these chlorinated butylphenols, as their sodium salts, was then reacted with methyl chloroacetate and the mixture heated under reflux at about 80° C. for an hour. The corresponding chloro para-tertiary butylphenoxyacetic acid mixed isomers, formed by subsequent hydrolysis with 10% NaOH followed by acidolysis with dilute HCl, were tested for hormone activity by applying 1% lanolin ointments to the stems of coleus plants. Similar plants were sprayed with 0.1% solutions of the sodium salts of these acids. Each of these fractions contained some of the by-product 2,4 dichlorophenoxyacetic acid as the hormone ingredient. The observed effects follow:

| Product-Phenoxyacetic Acid from: | Epinastic responses produced by treating stems with 1% lanolin ointment | Effect of spraying foliage with 0.1% aqueous solution of Na-salts |
|---|---|---|
| A. para-tertiary butyl-monochlorophenols. | Strong | Herbicidal. |
| B. para-tertiary butyl dichloro-phenols. | Exceedingly strong | Strongly herbicidal. |
| C. para-tertiary butyl trichloro-phenols. | Weak | Weak. |
| D. para-tertiary butyl-tetrachlorophenols. | Inactive | Inactive. |

EXAMPLE II

One-tenth per cent aqueous solutions of the sodium salts of 2,4-dichlorphenoxyacetic acid, and of the acid of product A of Example I and of the acid of product B of Example I, were prepared using distilled water and the pH of the resulting solutions adjusted to 7.0. Surface tension measurements were then conducted on these solutions, as shown by the following results:

| Solution | Surface Tension at 20° C. (Dynes/Centimeter) |
|---|---|
| 1. Distilled water | 72.6 |
| 2. 0.1% Aqueous solution of sodium salt of 2,4-dichlorophenoxyacetic acid | 71.9 |
| 3. 0.1% Aqueous solution sodium salt of para-tertiary butyl-monochloro-phenoxyacetic acid | 63.5 |
| 4. 0.1% Aqueous solution sodium salt of para-tertiary butyl-dichlorinated-phenoxyacetic acid | 60.3 |

These data confirm field observations that the products of this invention wet plant surfaces much better than the straight chlorinated phenoxyacetic acids.

EXAMPLE III

Onto a test plot containing mixed lawn grasses and dandelion plants was sprayed an 0.08% aqueous solution of the sodium salt of crude para-tertiary butyl-dichloro-phenoxyacetic acid so that the foliage of all species was thoroughly wetted. At the same time the entire soil was watered with a dilute aqueous solution of inorganic plant nutrients ($KH_2PO_4$, $Ca(NO_3)_2$, $MgSO_4$). At the end of 15–20 days the dandelion plants were completely dead, while the grasses were more luxurious than at the start of the test.

EXAMPLE IV

Pure para-tertiary butyl phenol was chlorinated by heating the material to its melting point, introducing chlorine by bubbling in the dark, and the temperature was then gradually allowed to fall to 60–80° C., at which point chlorination was continued until weight gained indicated a di-chloro stage as having been reached. Crude dichlorinated butyl phenols were then removed and caustic extracted to separate alkali insoluble material and the soluble phenols then regenerated with acid, washed, dried and vacuum fractionated. Some 3900 grams of the crude chlorinated phenols were subjected to chlorine, hydrogen, and carbon analyses and each converted by conventional means to the corresponding phenoxy acetic acids. Each of the phenoxy acetic acids thus prepared was tested for hormone epinastic response employing coleus plants. This was done in order to ascertain hormone activity of the pure compounds. These responses, along with additional information on the fractions, are listed in the attached table.

| | Cl | H | C |
|---|---|---|---|
| Theoretical composition of dichloro-phenol | 43.5 | 2.45 | 44.1 |
| Theoretical composition of butyl-dichloro-phenol | 32.4 | 5.48 | 54.8 |

The pure para-tertiary-butyl-dichloro-phenoxy-acetic acid was a white crystalline solid melting at 82° C. and the composition shown below:

| | Cl | H | C |
|---|---|---|---|
| Theoretical | 25.65 | 5.06 | 52.0 |
| Actual | 25.61 | 5.76 | 52.12 |

EXAMPLE V

In a manner similar to that employed in Example IV a crude para-tertiary-amyl-dichloro-phenol was prepared of approximately 90% purity which, when converted to its corresponding phenoxy acetic acid, yielded a substance possessing strong hormone activity in plants. However, when purified to produce a pure para-tertiary-amyl-dichloro-phenol of the following composition:

| | Cl | H | C |
|---|---|---|---|
| Theoretical | 30.47 | 6.0 | 56.6 |
| Actual | 30.66 | 6.06 | 56.56 | and then converted to its corresponding phenoxy-acetic acid, the latter compound was found to possess no hormone activity in plants.

EXAMPLE VI

In a manner similar to that of Example II, a crude para-tertiary-octyl-dichloro-phenoxy-acetic acid was synthesized which exhibited marked hormone activity in the coleus plant. However, when a substantially pure para-tertiary-octyl-dichloro-phenol was prepared of the following composition:

| | Cl | H | C |
|---|---|---|---|
| Theoretical | 25.8 | 7.26 | 61.1 |
| Actual | 26.29 | 7.48 | 62.0 | and converted into its corresponding phenoxy-acetic acid, the latter material was found to possess no hormone activity in plants.

EXAMPLE VII

Lanolin ointments were prepared, containing 2% of total phenoxyacetic acids as indicated in the following tabulation. Each of these prepa-

*Table I*

| Cut No. | Grams of Chlorinated Phenols | Distillation Range | Cl | H | C | Composition | Hormone Activity of Corresponding Phenoxy Acetic Acid |
|---|---|---|---|---|---|---|---|
| 1 | 95 | 82–112° C. at 16 mm | 42.41 | 2.19 | 45.27 | 2,4-dichloro-phenol | Very active. |
| 2 | 270 | 102–108° C. at 13 mm | 40.66 | 3.10 | 47.13 | Mainly 2,4-dichloro-phenol | Do. |
| 3 | 312 | 103–105° C. at 11 mm | 33.93 | 4.49 | 53.04 | Mixture of 2,4-dichloro-phenol & tertiary-butyl-monochloro-phenol. | Do. |
| 4 | 788 | 104° C. at 8 mm | 20.25 | 7.12 | 65.33 | Principally t-butyl-monochloro-phenol | Little activity. |
| 5 | 155 | (One 104° C. at 8 mm) (Two 105° C. at 6 mm) | 28.49 | 6.01 | 58.32 | Mainly t-butyl-dichloro-phenol | Slight activity. |
| 6 | 2,070 | 132° C. at 9 mm | 32.42 | 5.66 | 54.91 | Pure tertiary-butyl-dichloro-phenol | Inactive. | rations was applied to the stems of coleus plants and the effects observed.

| Ingredients Added to Lanolin | Epinastic Response of Coleus Plants |
|---|---|
| A. Pure para-tertiary butyl-dichloro-phenoxy-acetic acid. | Inactive. |
| B. 75% of A plus 25% of G | Very active. |
| C. Pure para - tertiary - amyl - dichloro - phenoxy-acetic acid. | Inactive. |
| D. 75% of C plus 25% of G | Very active. |
| E. Pure para - tertiary - octyl - dichloro - phenoxy-acetic acid. | Inactive. |
| F. 75% of E plus 25% of G | Very active. |
| G. Pure 2,4-dichloro-phenoxy-acetic acid | Do. |

EXAMPLE VIII

In an attempt to ascertain the minimum concentrations of the active hormone 2,4-dichloro-phenoxy-acetic acid, required in a mixture with an inactive material of this invention in order to retain strong hormone activity, various blends of pure 2,4-dichloro-phenoxy-acetic acid (A) and pure tertiary-butyl-dichloro-phenoxy-acetic acid (J) were prepared. Each of these mixtures was blended with lanolin in 2% total concentration and applied to the stems of coleus plants and observed over a period of 11 days. The data are summarized below:

| | Hormone Response in Coleus Plants | | |
|---|---|---|---|
| | 2 days | 9 days | 11 days |
| A. 100% 2,4-dichloro - phenoxy - acetic acid. | Strong epinasty. | Partially dead | Dead. |
| B. 75% A, 25% J | do | do | Do. |
| C. 50% A, 50% J | do | do | Do. |
| D. 25% A, 75% J | do | Dead | Do. |
| E. 20% A, 80% J | do | Partially dead | Do. |
| F. 15% A, 85% J | do | do | Do. |
| G. 10% A, 90% J | do | do | Do. |
| H. 5% A, 95% J | do | Non-Lethal | Partially dead. |
| I. 1% A, 99% J | Mod. epinasty | do | Non-Lethal. |
| J. 100% para - tertiary - butyl - dichloro - phenoxy-acetic acid (pure). | No effect | No effect | No effect. |

EXAMPLE IX

A one-acre farm field heavily infested with weeds of various types was divided into two approximately equal proportions. Onto one of these was sprayed a 0.1% aqueous solution of 2,4-dichloro-phenoxy-acetic acid in the form of its sodium salt at the rate of one pound per acre. Onto the other plot was applied a 0.1% aqueous solution of a mixture consisting of 90% of the sodium salt of para-tertiary-butyl-dichloro-phenoxy acetic acid and 10% of 2,4-dichloro-phenoxy-acetic acid. Visual observation at the end of one week revealed that the weeds in the second plot were more strongly affected than those in the first plot and were appreciably nearer a state of destruction. In addition, some types of weeds, particularly those referred to as wild onions or wild garlic, were seriously twisted and browned by the second treatment, whereas the first treatment with 2,4-dichloro-phenoxy-acetic acid alone had produced very little change in this particular weed.

While the products of this invention are intended primarily as selective weed killing hormone synergists they may also be used advantageously in hormone compositions for other purposes such as in the treatment of tubers or cuttings to induce rooting, to delay sprouting, to retard budding, to prevent premature fruit drop, to induce fruit set, to accelerate or retard germination of seeds, to produce seedless fruits, berries, etc., or for any other application to growing plants or dormant propagative units. They may be used alone, in combination with each other, or in combination with other plant or soil adjuvants. For application as herbicides they may be applied as their sodium salts, heavy metal salts, triethanolamine salts, esters, amides, nitriles, etc., and may be conveyed either in aqueous solution, oil solution, in solid form deposited on dusts, etc., or in aerosol mist form. They may also be supplemented with insecticides, fungicides, fertilizers, and the like.

Some of the weeds against which the composition of this invention are especially effective are mugwort (*Artemisia vulgaris*), poison ivy (*Toxicodendron radicans*), white clover (*Trifolium repens*) dandelion (*Taraxacum officinale*), ground ivy (*Nepeta hederacea*), wild onion (*Allium sp.*), broad-leaf plantain (*Plantago major*), buckhorn or narrow-leaf plantain (*Plantago lanceolata*), red or sheep sorrel (*Rumex acetosella*) and yarrow (*Achillea millefolium*).

The foregoing description is intended to illustrate suitable methods for preparing the compounds and for using them in stimulating plant growth, even to the extent of herbicidal action, according to the present invention. In general, concentrations of the order of about one part per million are used in the control of growth of fruit and buds in orchards, about one part per hundred thousand in the stimulation of root growth and about one part per thousand or higher concentrations in causing herbicidal action.

This invention is not to be limited either to the examples discussed or methods of application except as defined in the appended claims.

What is claimed is:

1. As new chemical compounds para-tertiary lower alkyl chlorophenoxy acetic acids.

2. A new mixture of isomers of the general formula

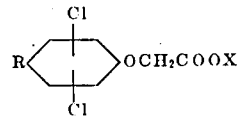

wherein R is a tertiary lower alkyl radical and X is a radical selected from the group consisting of sodium, hydrogen and lower alkyl radicals.

3. A new mixture of isomers as in claim 2 wherein the tertiary alkyl radical is tertiary butyl and X is hydrogen.

4. A new mixture of isomers as in claim 2 wherein the tertiary alkyl radical is tertiary octyl and X is hydrogen.

5. A new mixture of isomers as in claim 2 wherein the tertiary alkyl radical is tertiary butyl and X is sodium.

6. A plant regulant composition comprising 2,4 dichlorophenoxyacetic acid and a para-tertiary lower alkyl dichlorophenoxyacetic acid derivative as a synergist therefor.

7. A plant regulant composition comprising 2,4-dichlorophenoxyacetic acid and a para-tertiary lower alkyl chlorophenoxyacetic acid as a synergist therefor.

8. A plant regulant composition as in claim 7 wherein the para-tertiary-alkyl chlorophenoxy acid is a para-tertiary-butyl dichlorophenoxyacetic acid.

9. A plant regulant composition as in claim 7 wherein the para-tertiary-alkyl chlorophenoxy acid is a para-tertiary-octyl dichlorophenoxyacetic acid.

10. A method of controlling the growth of plant life which comprises distributing a plant regulant composition comprising 2,4-dichlorophenoxyacetic acid and a para-tertiary lower alkyl chlorophenoxyacetic acid as a synergist therefor to effect contact of the composition with the plants.

MILLER W. SWANEY.
LEO Z. JASION.

REFERENCES CITED

The following references are of record in the file of this patent:

UNITED STATES PATENTS

| Number | Name | Date |
|---|---|---|
| 554,938 | Lederer | Feb. 18, 1936 |
| 2,129,598 | Zimmerman | Sept. 6, 1938 |
| 2,252,666 | Reiff et al. | Aug. 12, 1941 |
| 2,322,761 | Lontz | June 29, 1943 |
| 2,396,513 | Jones | Mar. 12, 1946 |
| 2,412,510 | Jones | Dec. 10, 1946 |
| 2,435,676 | Fitzgerald | Feb. 10, 1948 |
| 2,437,527 | Hester et al. | Mar. 9, 1948 |

OTHER REFERENCES

Chemical Abstracts, vol. 41 (1947), columns 3903, 3904 and 3909.

Botanical Gazette, June, 1946, pages 475 to 507.